(12) United States Patent
Miller

(10) Patent No.: US 10,190,907 B1
(45) Date of Patent: Jan. 29, 2019

(54) CONVEX WARM SHIELD FOR THERMAL IMAGING DEVICE

(71) Applicant: Raytheon Company, Waltham, MA (US)

(72) Inventor: Steven Miller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/721,552

(22) Filed: Sep. 29, 2017

(51) Int. Cl.
*G01J 1/02* (2006.01)
*G01J 5/08* (2006.01)
*G01J 5/06* (2006.01)

(52) U.S. Cl.
CPC ........... *G01J 1/0271* (2013.01); *G01J 5/0809* (2013.01); *G01J 2001/0276* (2013.01); *G01J 2005/065* (2013.01); *G01J 2005/067* (2013.01)

(58) Field of Classification Search
CPC .. G01J 5/061; G01J 5/08; G01J 5/0803; G01J 5/0806; G01J 5/0809; G01J 5/0815; G01J 5/0862; G01J 5/0875; G01J 5/522; G01J 2005/0077; G02B 13/16; G02B 27/0018; G02B 13/14
See application file for complete search history.

(56) References Cited

U.S. PATENT DOCUMENTS

| 2,738,700 | A | | 3/1956 | Taylor |
| 3,445,659 | A | | 5/1969 | Guimento et al. |
| 4,217,026 | A | | 8/1980 | Radovich |
| 4,339,748 | A | | 7/1982 | Guscott et al. |
| 4,431,917 | A | | 2/1984 | Gibbons |
| 4,507,551 | A | | 3/1985 | Howard et al. |
| 4,542,963 | A | | 9/1985 | Linlor |
| 4,820,923 | A | | 4/1989 | Wellman |
| 4,820,929 | A | | 4/1989 | Modisette et al. |
| 4,990,782 | A | | 2/1991 | Wellman et al. |
| 5,135,183 | A | * | 8/1992 | Whitney ............... F41G 7/2253 244/3.16 |
| 5,149,970 | A | * | 9/1992 | Whitney ............... F41G 7/2253 250/226 |
| 2004/0119020 | A1 | | 6/2004 | Bodkin |

(Continued)

FOREIGN PATENT DOCUMENTS

| EP | 2627979 A1 | 8/2013 |
| WO | WO 2012/049683 A1 | 4/2012 |

OTHER PUBLICATIONS

International Search Report for International Application No. PCT/US2018/044254 dated Oct. 25, 2018, 14 pages.

*Primary Examiner* — Kiho Kim

(57) ABSTRACT

A warm shield as part of a thermal imaging system comprising a reflecting surface having a convex curvature that when positioned relative to an opening of a thermal imaging system, thermal energy originating from the opening of the thermal imaging system incident on the convex curvature is reflected in a direction away from the opening of the thermal imaging system. An aperture can be formed in the reflecting surface and positioned to facilitate passage therethrough of external thermal energy in a direction towards a detector of the thermal imaging system, and passage of at least some of the thermal energy originating from within the thermal imaging system in a direction away from the thermal imaging system.

21 Claims, 13 Drawing Sheets

(56) References Cited

U.S. PATENT DOCUMENTS

| | | | |
|---|---|---|---|
| 2004/0211907 A1* | 10/2004 | Wellman | G01J 5/061 |
| | | | 250/353 |
| 2004/0212877 A1* | 10/2004 | Borchard | G02B 13/14 |
| | | | 359/359 |
| 2004/0218659 A1 | 11/2004 | Wellman et al. | |
| 2006/0180765 A1 | 8/2006 | Wolske | |
| 2011/0080483 A1 | 4/2011 | Oster et al. | |
| 2011/0279681 A1 | 11/2011 | Cabib et al. | |

* cited by examiner

US 10,190,907 B1

CONVEX WARM SHIELD FOR THERMAL IMAGING DEVICE

GOVERNMENT LICENSE RIGHTS

This invention was made with government support under FA8620-06-4010 awarded by the Department of Defense. The government has certain rights in the invention.

BACKGROUND

Imaging systems are employed to generate visualizations of images. The human eye is a prime example of an imaging system. Designed by nature to operate in the visible spectrum, the eye requires external illumination by sources such as celestial bodies or man-made emitters to generate flux that the retina requires. Imaging systems or devices can be designed to allow a human user to see images or visualizations of objects that are not visible to the human eye. For example, an imaging system can display objects that are detected using spectrums outside of the visible spectrum. Alternatively, an imaging system can operate to display objects in settings where there is inadequate light for the human eye to operate.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
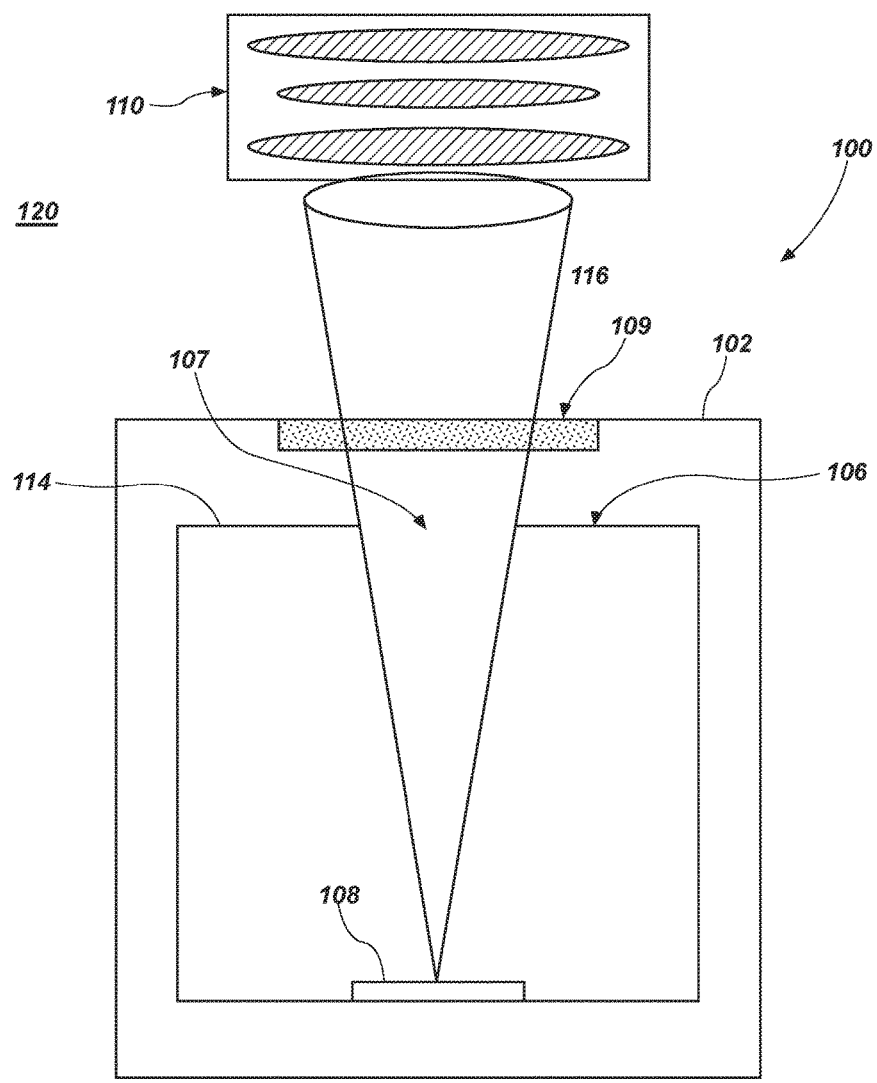
FIG. 1 illustrates a block diagram of a thermal imaging system without a warm shield.

Reference will now be made to the exemplary examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology examples is provided below and then specific technology examples are described in further detail later. This initial summary is intended to aid readers in understanding the technology more quickly, but is not intended to identify key features or essential features of the technology nor is it intended to limit the scope of the claimed subject matter.

Broadly speaking, this invention addresses specific aspects of noise reduction in thermal imaging systems. MWIR and LWIR cameras or detectors in the thermal imaging systems can require the sensing element be cryogenically cooled. These cooled elements can be contained in a vacuum-sealed case or Dewar. The cooling is necessary for low noise operation of the semiconductor materials used. In one example, modern cooled detectors operate in the 60 K to 100 K range, depending on type and performance level. The sensing element can be exposed to external radiation only through an aperture or 'cold stop' mounted internal to the Dewar. In one example, maximum performance benefits are achieved when the system stop is placed at this location. The cold shield therefore restricts the solid angle through which radiation can pass and impinge on the focal plane array or FPA.

In one example, high performance thermal imaging cameras can be equipped with multiple f-stop and fields-of-view (FOV) configurations for examining scenes at different magnification. For at least one of these configurations, the cold stop will define the system f-number. Since there are currently no reliable methods for varying cold stop diameter internal to the Dewar, external apertures must be inserted in order to effect variable f-number. In one example, a mechanical aperture can be inserted into a thermal imaging system. FOV switching is achieved by mechanical insertion or removal of a lens group. In another example, a mechanical aperture can be inserted in conjunction with a lens group. Placement of the aperture can be made to coincide with design-related shifts in stop location which occur when lens count changes.

Unlike the cold shield which is maintained at cryogenic temperature, the aforementioned warm shield will be at ambient temperature. Such apparatus are commonly termed warm shields. In one example, a thermal imaging system comprises a warm shield with an aperture. State-of-the-art warm shields are reflective and concave in shape.

Unlike current state-of-the-art warm shields comprising concave configurations, examples of the present disclosure comprise a convex warm shield having an aperture. The convex warm shield can be formed with a convex surface relative to an opening to the thermal imaging system or Dewar.

The effectiveness and useful implementation of a convex warm shield can depend upon the proximate closeness of the warm shield to the Dewar and can also be dependent upon the size of the opening in the Dewar. In other words, in many configurations conventional solutions can be more effective than a convex warm shield, as will be recognized by those skilled in the art.

The convex warm shield can be considered a component of the thermal imaging system, an accessory, an attachment, or separate from the thermal imaging system. Advantageously, in some examples, the convex warm shield eliminates or mitigates secondary optical paths which images structural components of the thermal imaging system and reduces thermal background compared to conventional warm shields. In some examples compared to conventional solutions, the convex warm shield also eliminates or mitigates foreign object debris- and defect-related artifacts in thermal imagery.

It should be appreciated that the convex curvature of the convex warm shield can be tuned or shaped to compensate for a specific artifact that is being generated. Additionally, the size or shape of the aperture in the convex warm shield can similarly be tuned or shaped to compensate for a specific artifact. In one example, the convex warm shield can be mounted in a bracket to support the convex warm shield. The bracket can have more than one opening or can be capable of supporting more than one warm shield, or a lens, or a window.

The bracket can be selectively moved or swiveled to allow the convex warm shield to be moved into position over the opening of the thermal imaging system or away from the opening. Thus, the convex warm shield can be optionally used during operation of the thermal imaging system.

The thermal imaging system and the convex warm shield can be mounted in a system or device such as a vehicle. In one example, the thermal imaging system and the convex warm shield can be mounted in an aircraft. In another example, the thermal imaging system and the convex warm shield can be employed in a weapons system, to assist in targeting.

One example of a thermal imaging system 100 is illustrated in FIG. 1. The thermal imaging system 100 can comprise collection optics 110 and a Dewar enclosure 102, referring to the enclosure or container housing components of the thermal imaging system stop and sensor element. The thermal imaging system 100 can be a conventional thermal imaging system depicted without a warm shield. The Dewar enclosure 102 can be sealed to protect the components being housed. For example, Dewar enclosure 102 houses a sensing element or detector 108. The Dewar enclosure 102 comprises a window 109, which can be placed in an opening of the Dewar enclosure 102. The window 109 can be composed of glass or other materials, such as semiconductor alloys, that is transparent to thermal energy. The window 109 can function to protect the components in the Dewar enclosure 102 from dirt and other debris while allowing thermal energy to pass through. A cold stop 106 can be an inner enclosure within the Dewar enclosure 102. The cold stop 106 can comprise an aperture or opening 107 that acts as a limiting aperture for the thermal imaging system 100 in a manner similar to the iris in a human eye or an aperture in a camera.

Generally speaking, cold objects seen by the thermal imaging system 100 are, by analogy to the human eye or a common camera, dark or dim while warm things are bright. As a result, the thermal imaging system 100 sees not only radiation from external sources viewed through its optics but also radiation from the optics and hardware that make up the thermal imaging system 100 since they too are "warm." Therefore, the thermal energy emitted by the thermal imaging system 100 itself is inherently part of the total energy collected by its sensing element. This sensing element in thermal imaging systems is often referred to as a focal plane array (FPA).

Since lenses, mirrors and hardware are generally at temperatures similar to the external scene being viewed, prior or conventional thermal imaging systems are typically designed to minimize that self-contribution. The conventional approach is to enclose the FPA in a Dewar. An external thermodynamic compressor engine can keep the inner enclosure and its contents at temperatures far below those of the external objects being viewed. In the thermal imaging system 100, the window 109 in the Dewar enclosure 102 allows external radiation collected by the optics 110 to impinge on the FPA through a circular aperture 107 of the cold stop 106 (the aperture and the cold stop or shield structure defining the aperture often being referred to simply as a cold stop).

Thermal imaging systems are very often designed with more than one field-of-view (FOV). FOV can be thought of as the angular subtense of the optics 112 in object space as shown in FIG. 1. A wide FOV system sees a large angle while a narrow FOV sees a small angle. This change in angular subtense is achieved by mechanical means, namely moving a subset of the lenses either into or out of the optical train. In some instances, optimum optical performance can only be achieved by allowing the stop to shift locations. This shift in location is inevitably farther away from the FPA, usually outside the confines of the Dewar. In the present case, the stop will no longer be at low temperature and becomes a warm object within view of the FPA.

The thermal flux from an object falling on the detector 108 can be given by the radiance L of the object times the area A of the detector times the solid angle $\Omega$ subtended by the object. Equation 1 shows this relationship in equation form.

$$\phi_{det} = L_{obj} * A_{det} * \Omega_{obj} \qquad \text{Equation 1}$$

The thermal radiance of an object is given by its emissivity $\varepsilon$ times the fractional blackbody integral $f(\lambda 1, \lambda 2, T)$ times $\sigma T^4$ where $\sigma$ is the Stefan-Boltzman constant and T is the temperature in Kelvin. Equation 2 shows this relationship in equation form.

$$L=\varepsilon f(\lambda 1,\lambda 2,T)\sigma T^4 \qquad \text{Equation 2}$$

From equation 2, the emissivity $\varepsilon$ acts as a scale factor for a given wave band and temperature. Therefore, the total flux on the detector 108 is $$\phi_{det}=\varepsilon_{obj}f(\lambda 1,\lambda 2,T_{obj})\sigma T_{obj}^4 A_{det}\Omega_{obj} \qquad \text{Equation 3}$$

The following discussion centers around what the FPA sees from its position inside the Dewar.

FIG. 1 depicts a thermal imaging system 100 having a cold shield 114 and a cold stop 106. FIG. 1 can depict what an FPA sees from a position inside of the Dewar 102 associated with the thermal imaging system 100. Flux from a scene 120 near or around the thermal imaging system 100, as well as flux and self-emission from the optics 110 of thermal imaging system 100 can pass through the cold stop 106. Outside the area of the opening or aperture 107, the FPA sees only flux from the cold shield 114. By virtue of its temperature, the cold shield 114 contribution is negligible since its radiance at cryogenic temperatures is significantly less than the warm objects at ambient temperatures. As an example, for two bodies of the same size and emissivity, the radiant power per square centimeter per steradian at 120K is 2.6 µW, while at 300K it is 3.8 mW in the waveband 8-12 µm; a factor of 1500. For the 3.5-5 µm band, the difference is 1.7E−11 W vs 175 µW or a factor of $10^7$. Therefore, a resulting relationship is described by equation 4.

$$\phi_{total}=\phi_{scene}+\phi_{cold\ shield}\approx\phi_{scene} \qquad \text{Equation 4}$$

Figure 2:
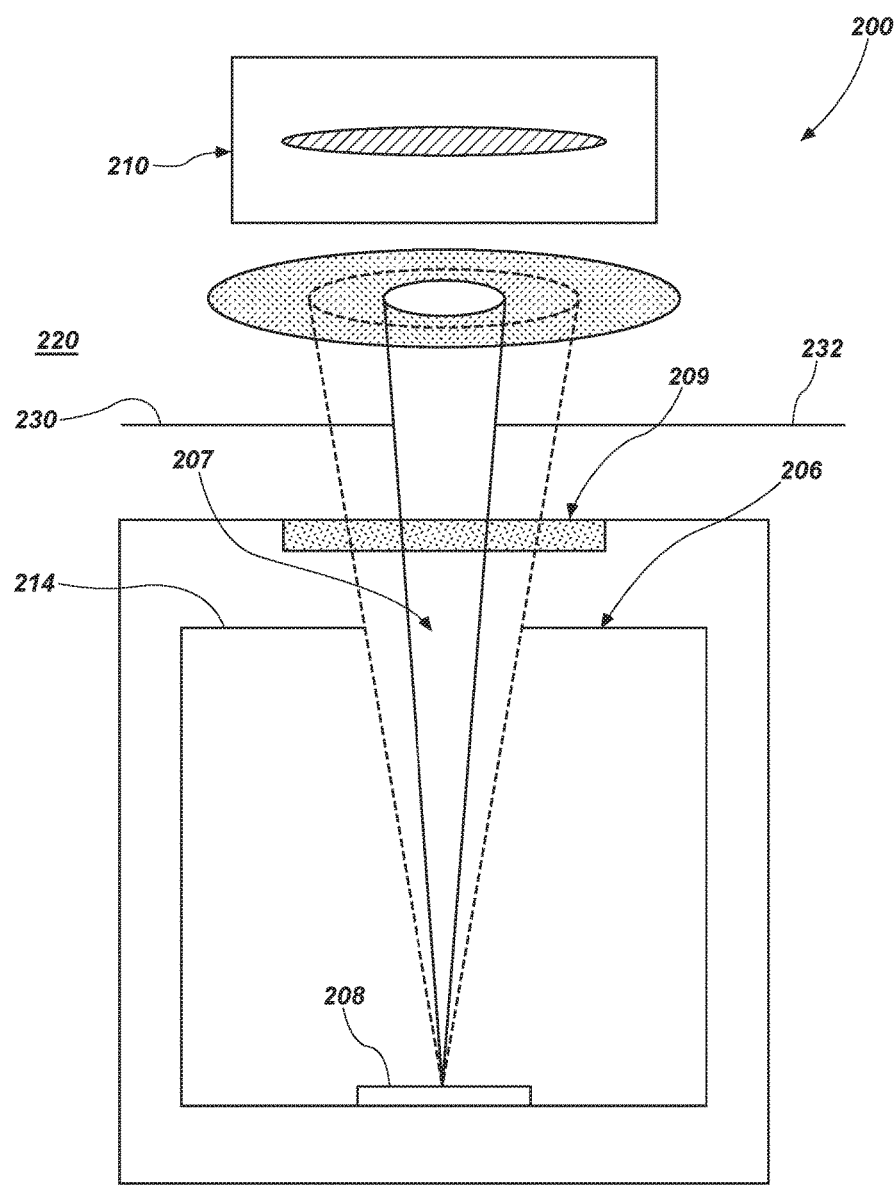
FIG. 2 illustrates a block diagram of a thermal imaging system with a warm shield.

FIG. 2 depicts a thermal imaging system 200 adjacent a scene 220 similar to the thermal imaging system 100 of FIG. 1. As such, the description above is intended to be incorporated or applicable here as will be recognized by those skilled in the art. For example, the thermal imaging system 200 comprises optics 210 and a Dewar enclosure 202 that houses sensing element 208. The Dewar enclosure 202 can comprise a window 209. The thermal imaging system 200 can further comprise a cold stop 206 having an aperture 207. Unlike the thermal imaging system 100 of FIG. 1, the thermal imaging system 200 further comprises a warm stop 230 and warm shield 232. Although the warm stop 230 is not shown as comprising any particular shape, this figure depicts what the FPA sees when a warm stop is utilized. Generally speaking, the warm stop 230 reduces the opening compared to the opening 109 of FIG. 1, through which the scene and self-emission passes. In the annular region between the warm stop and the cold stop 206, the FPA sees the surface of the warm shield. This relationship is described by equation 5.

$$\phi_{total}=\phi_{scene}+\phi_{warm\ shield} \qquad \text{Equation 5}$$

From equation 5, the thermal contribution from the surface of the warm shield can be minimized by reducing its emissivity. This can be accomplished by making the warm shield highly reflective. However, when the warm shield is reflective, the FPA can see other objects in reflection. The shape of the warm shield will then determine what additional objects can be seen by the FPA.

Figure 3:
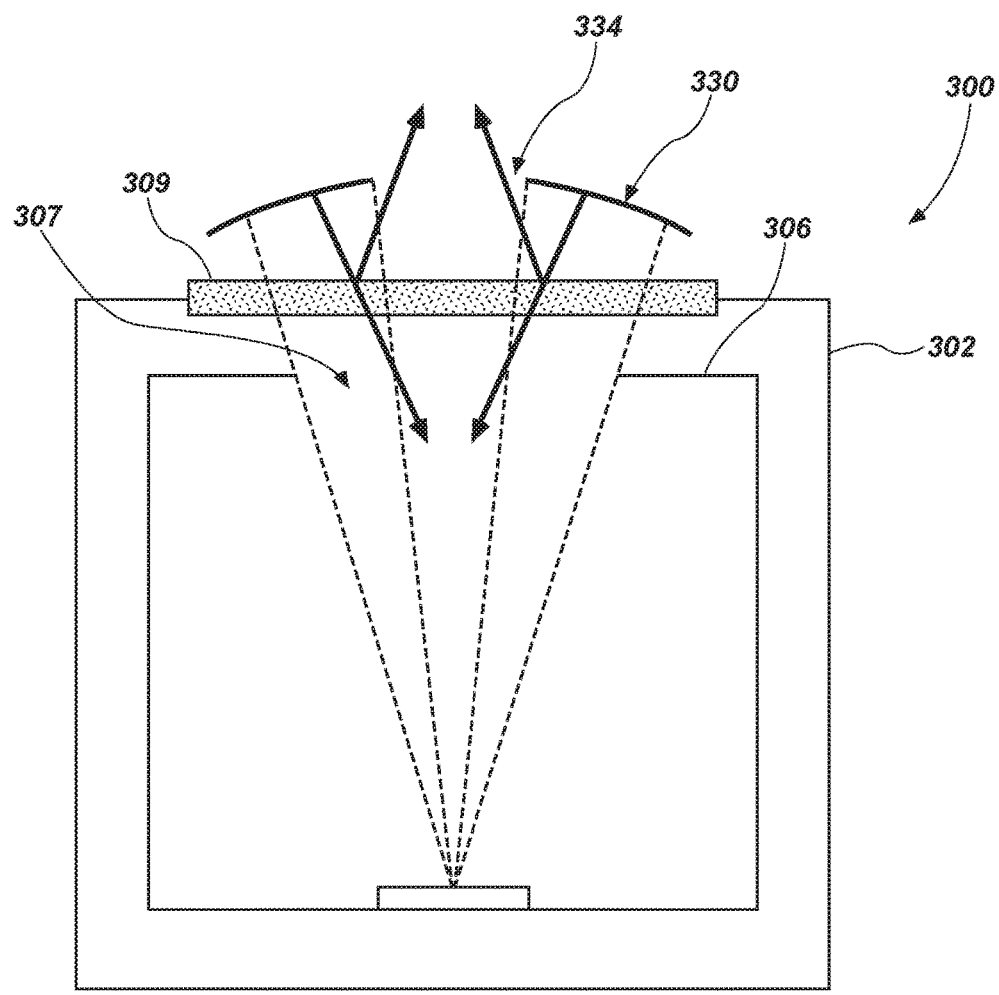
FIG. 3 illustrates a side cross-sectional view of a prior, conventional thermal imaging system comprising a warm shield of concave curvature, wherein a portion of the solid angle subtended by the cold aperture is shown returning through the cold aperture and another portion is shown reflecting from the Dewar window and passing in retrograde back through the warm shield aperture.

In prior solutions, such as the thermal imaging system 300 shown in FIG. 3 having a warm shield 330 having an opening 334, the surface of the warm shield 330 comprises a concave configuration relative to the Dewar enclosure 302 and a Dewar window 309. Such a concave shape directs all flux from the surface of the warm shield 330 facing the Dewar 302 back through the cold stop 306 and into a cold volume. This flux of magnitude (M) is described by equation 6, $$M=R_{warmshield}*\phi_{coldshield} \qquad \text{Equation 6}$$

and is negligible compared to scene and warm shield flux as previously explained, so that the result is described by equation 7.

$$\phi_{total}=\phi_{scene}+\phi_{warmshield}+R_{warmshield}*\phi_{coldshield}\approx\phi_{scene}+\phi_{warmshield} \qquad \text{Equation 7}$$

Under ideal conditions, the thermal contribution within the annular region of thermal imaging system 300 is that of the low emissivity of the surface of the warm shield 330 only. However, account must be taken of the Dewar window's 309 presence since its surfaces can also be reflective. As a consequence, a portion of the reflection from the Dewar window 309 is directed towards opening 334 of the warm shield 330 so that their thermal contributions become part of what the FPA sees in the annular region. Therefore, the total flux on the FPA is described by equation 8, $$\phi_{total}=\phi_{scene}+\phi_{warmshield}+q*R_{win}*\phi_{scene} \qquad \text{Equation 8}$$

where $R_{win}$ is the reflectivity of the Dewar window and q is a scale factor proportional to the area of the annular region. In general, multiple optical elements involved in forming an image from the flux in the scene and that of the optics themselves are emission sources. It is then worth noting that the rays reflected from both a concave warm shield and Dewar window follow a different path through the aperture 334 of the warm shield 330. In following this different path, the reflected flux can be uniform and cause only an elevation of the background or it can be concentrated on some region(s) of the FPA and generate noticeable image artifacts. The reflectance (R) of the Dewar window can influence the relative magnitude of any artifact. Therefore, while the magnitude of flux in the fourth term of equation 8 can be small compared to the scene flux, it is not the only important factor. For example, optical and mechanical elements in proximity to pupils within the optical system can form images artifacts by virtue of just such a parasitic path. In FIG. 3, a portion of the annular solid angle between the respective limiting apertures 307 and 334 of the cold stop 306 and the warm shield 330 is directed through the cold stop 306 while a portion of the same solid angle is directed through the aperture 334 of the warm shield 330 by reflection from the surface(s) of the Dewar window 309. It is this latter portion influenced by the curvature of the warm shield 330 that can result in non-uniformities and artifacts.

The need to eliminate artifacts caused by this non-uniformity has proven difficult in the past. Prior solutions included a warm shield with a concave curvature and attempts to increase or decrease the warm shield concave curvature only caused the non-uniformity to be slightly better or more poorly focused. As such, the present disclosure sets forth a unique design of a warm shield having a convex reflective surface strategically positioned to provide effective artifact reduction and/or elimination. This reversal of curvature effectively eliminates the parasitic path that results in artifacts. As will be discussed more fully below, the convex warm shield directs thermal energy within the solid angle away from the aperture of the warm shield and onto the top of a cold shield. In one example, an additional reflective 'skirt' or 'curtain' can be placed around the edge to turn a large portion of the solid angle back towards the center.

Figure 4A:
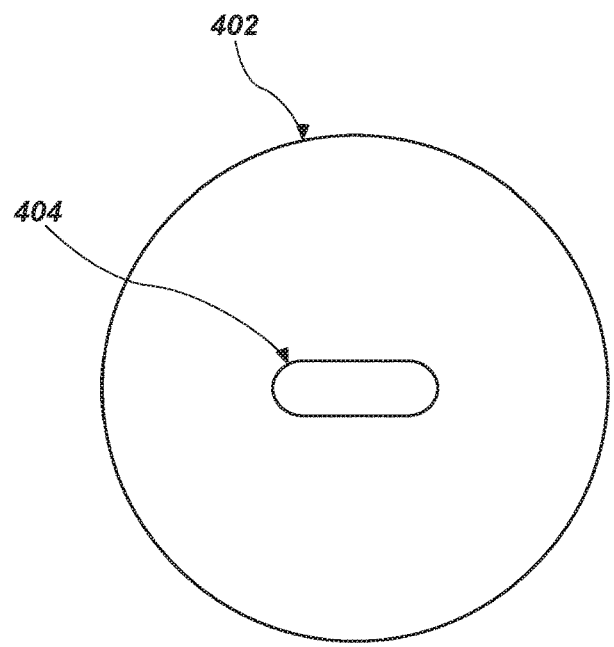
FIG. 4A illustrates a top view of a warm shield of convex curvature in accordance with an example of the present disclosure.
Figure 4B:
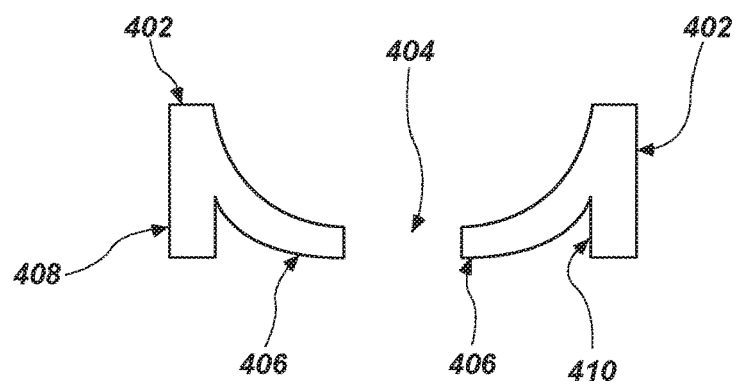
FIG. 4B illustrates a side cross-sectional view of the warm shield of FIG. 4A.

FIGS. 4A-4B depict a warm shield 402 in accordance with an example of the present disclosure, wherein the warm shield 402 or warm stop comprises a reflecting surface having a convex curvature, which can be effective in reducing or eliminating artifacts. For example, prior attempts made to alter the curvature of a warm shield by increasing or decreasing its concave curvature resulted in only negligible changes to the nature of the artifact. The present technology sets forth convex designs resulting in artifacts disappearing or being greatly reduced. The convex shape of the warm shield 402 prevents reflections from the Dewar window exiting the warm stop aperture 404 thereby eliminating the parasitic path. The convex warm shield 402 can shield, block or reflect thermal energy originating from within or external to a thermal imaging system. In one example, the convex warm shield 402 can be made of metal, a metal alloy, aluminum, or other similar material.

The convex warm shield 402 can comprise an aperture 404 configured to permit passage there through of thermal energy, which thermal energy can originate from within the thermal imaging system itself, or can be external to the thermal imaging system. The aperture 404 can be tuned or shaped to compensate for a specific artifact. In one example, various iterative warm shield designs having different configurations can be implemented and interchanged until the specific artifact of concern no longer appears or is minimized to where it does not interfere with other wanted images in the thermal image. The aperture 404 can also be tuned or designed mathematically to avoid iterative implementation. It should be appreciated that the outer shape of the convex warm shield 402 is shown as being circular, but this is not intended to be limiting in any way as the convex warm shield can comprise any perimeter geometry.

The warm shield 402 can further comprise a reflecting surface 406. The reflecting surface 406 can be designed and configured to reflect thermal energy originating from within the thermal imaging system away from the opening of the thermal imaging system. The reflecting surface 406 can be placed in close proximity to the opening of the thermal imaging system. It should be appreciated that the convex curvature is relative to the opening of the thermal imaging system. In one example, the convex curvature reflecting surface 406 can be tuned to compensate for a specific artifact. For example, the degree of curvature can be made more or less severe. The curvature can curve in a uniform fashion or it can curve more severely in one region of the curve compared to another region of the curve. The convex curvature can be tuned in an iterative fashion where a prototype is built and tested and then subsequent prototypes are built and tested, each with a different curvature than the next. The testing can assist in determining which convex curvature is best at eliminating or minimizing specific artifacts caused by thermal energy originating from within the thermal imaging system. Additionally, the convex curvature can be tuned mathematically before or after a prototype is built. For example, the convex curvature can be described by a mathematical equation.

The convex warm shield 402 can further comprise a sidewall 408 that can extend from the convex curvature (e.g., in the vertical direction as shown in FIG. 4B) and that is perpendicular to the adjacent surface of the thermal imaging system. The sidewall 408 can extend in a circumferential fashion around the perimeter of the convex warm shield 402. The sidewall 408 can comprise a vertical surface or skirt 410 that can also be configured to reflect thermal energy. Thermal energy can first reflect off of reflecting surface 406 and then off of surface 410. The sidewall 408 and surface 410 can be described as a skirt or curtain placed around the edge of the convex warm shield 402 to turn a large portion of the solid angle back towards the center. As described herein, a solid angle is the two-dimensional angle in three-dimensional space that an object subtends at a point. For example, thermal energy can be generated or radiate from a single point outwards in more than one direction. The solid angle can then refer to all the thermal energy radiated in between two directions.

Regarding placement of the warm shield 402 relative to the Dewar, a portion of the reflected thermal energy can begin to fall outside the aperture of the Dewar window in the event the warm shield 402 is located too far from the Dewar window. Moving it outside an acceptable range can cause loss of containment of the thermal energy radiating within the solid angle, and the warm shield 402 to thus admit a portion of the thermal energy from the environment around the Dewar since, in general, the environment will be warm and will lead to a significant increase in unwanted flux falling on the FPA. As a result, the effectiveness of the warm shield can be said to be at least somewhat dependent upon its particular configuration and its proximity to the Dewar so as to contain the thermal energy radiating within the solid angle. This is further described in more detail below.

Figure 5A:
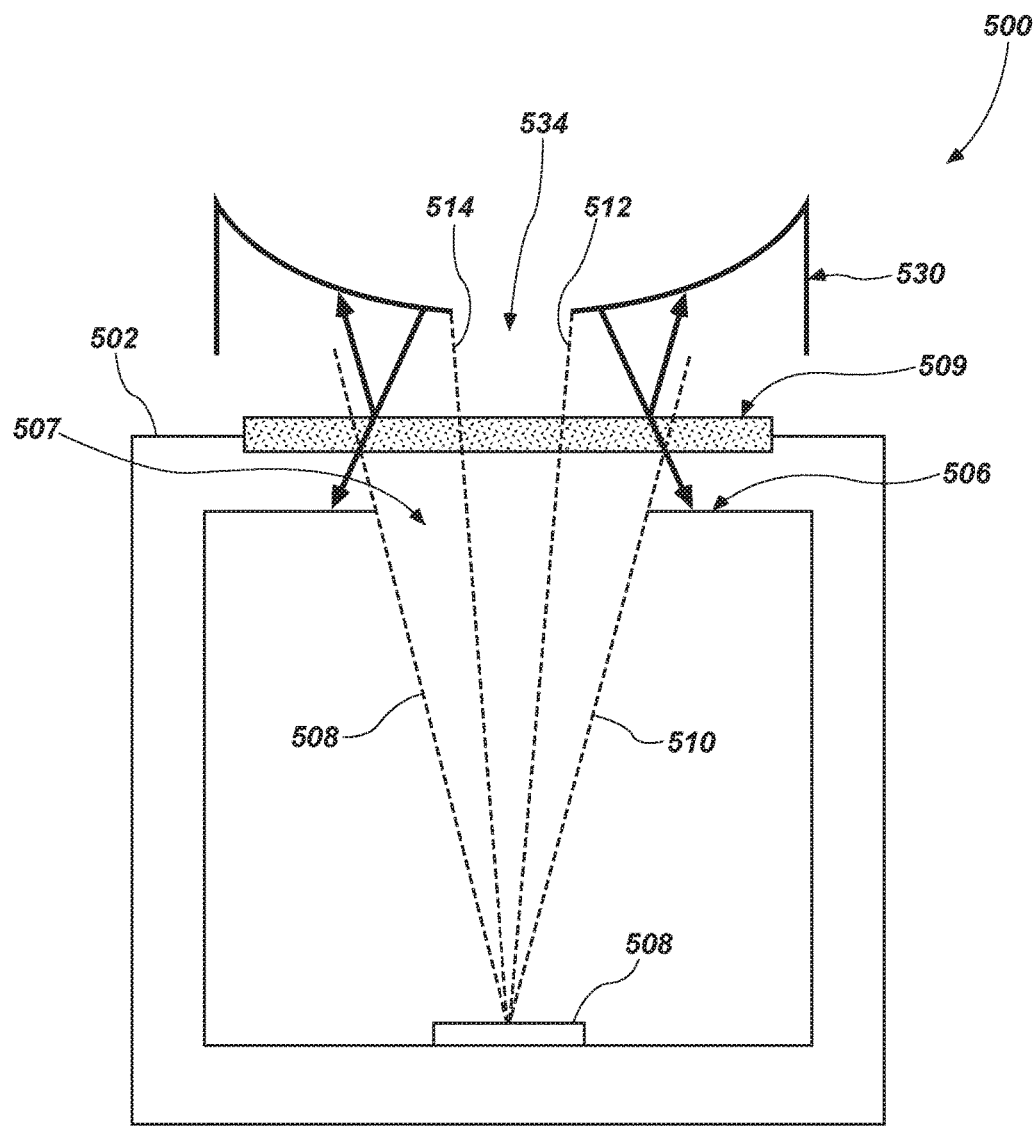
FIG. 5A illustrates a side cross-sectional view of a thermal imaging system comprising a warm shield of convex curvature in accordance with an example of the present disclosure, wherein substantially all of the solid angle subtended by the cold aperture is shown returning through the Dewar window by virtue of multiple reflections between the warm shield and Dewar window.
Figure 5B:
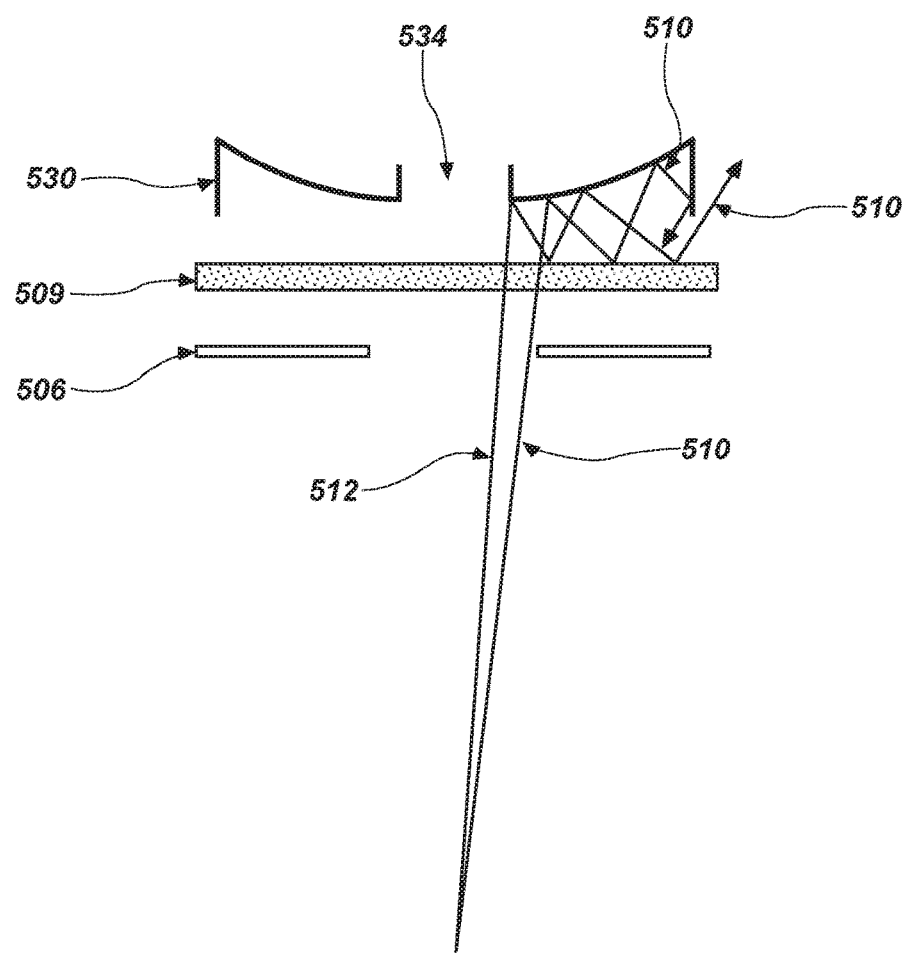
FIG. 5B illustrates a partial side cross-sectional of the thermal imaging system of FIG. 5A.

With reference to FIGS. 5A and 5B, graphically illustrated is a thermal imaging system 500 in accordance with an example of the present disclosure. The thermal imaging system 500 can comprise, at least in part, a convex warm shield 530 similar to that described above as pertaining to the convex warm shield 402 of FIGS. 4A and 4B. The thermal imaging system 500 can further comprise a Dewar or Dewar enclosure 502 having a window 509 and housing a sensing element or detector 508. The thermal imaging system 500 can further comprise a cold stop 506 having an aperture 597. These Dewar, window and cold stop elements can have features similar to the window and cold stop, respectively, of FIG. 1. FIG. 5 further depicts thermal energy 508, 510, 512, and 514 originating from within the thermal imaging system 500. The thermal energy represented by lines 508 and 510 can comprise the boundaries of the thermal energy permitted through the cold stop 506 and radiating from the same point within the thermal imaging system 500. As discussed herein, the thermal energy 508, 510, 512, and 514 can be generated by components of the thermal imaging system 500, such as the structural components making up or supporting the imaging system, as will be recognized by one skilled in the art. FIG. 5A depicts the thermal energy 508 and 510 as passing through the opening 507 of the cold stop 506, passing through the window 509, and being incident on the surface of the convex warm shield 530. Upon being incident on the warm shield 530, the thermal energy 508 and 510 can then be reflected away (i.e., outward) from the center of the convex warm shield 530. In addition, due to the convex shape of the warm shield 530, the thermal energy 508 and 510 can likewise be reflected away from the opening 507 in the cold stop 506. In this case, the thermal energy 508 and 510 is thus not detected by the detector 508 of the thermal imaging system 500. Likewise, the thermal energy 512 and 514 are shown as passing through the opening 507 of the cold stop 506, through the window 509, and through the aperture 534 of the convex warm shield 530. Thus, this energy is reflected back into the thermal imaging system 500.

FIG. 5B depicts the thermal energy 510 that originates from within the thermal imaging system can pass through the opening of the cold stop 506, can pass through window 507, and can be incident on the warm shield 530, which can comprise a convex curvature. Thermal energy 510 can be reflected away from the opening 534 in the convex warm shield 530, and can be caused to be incident on a surface of window 509, thus further reflecting the thermal energy 510 away. Based on the material makeup of the window 509, a portion of the thermal energy 510 can pass through the window 509 and a portion can be reflected away. The surface of the window 509 can be coated to cause the thermal energy 510, as well as other thermal energy, to be reflected away and not pass through. Thermal energy 510 can be reflected back and forth between the convex warm shield 530 and the surface of the window 509 many times before ultimately being directed away from the thermal imaging system 500. Thermal energy 510 is also depicted as reflecting off a vertical surface or skirt of the convex warm shield 530. Thermal energy 510 and 512 can be described as the boundaries of a solid angle for all thermal radiation radiating from a single point in a direction in between thermal energy 510 and 512.

Figure 6:
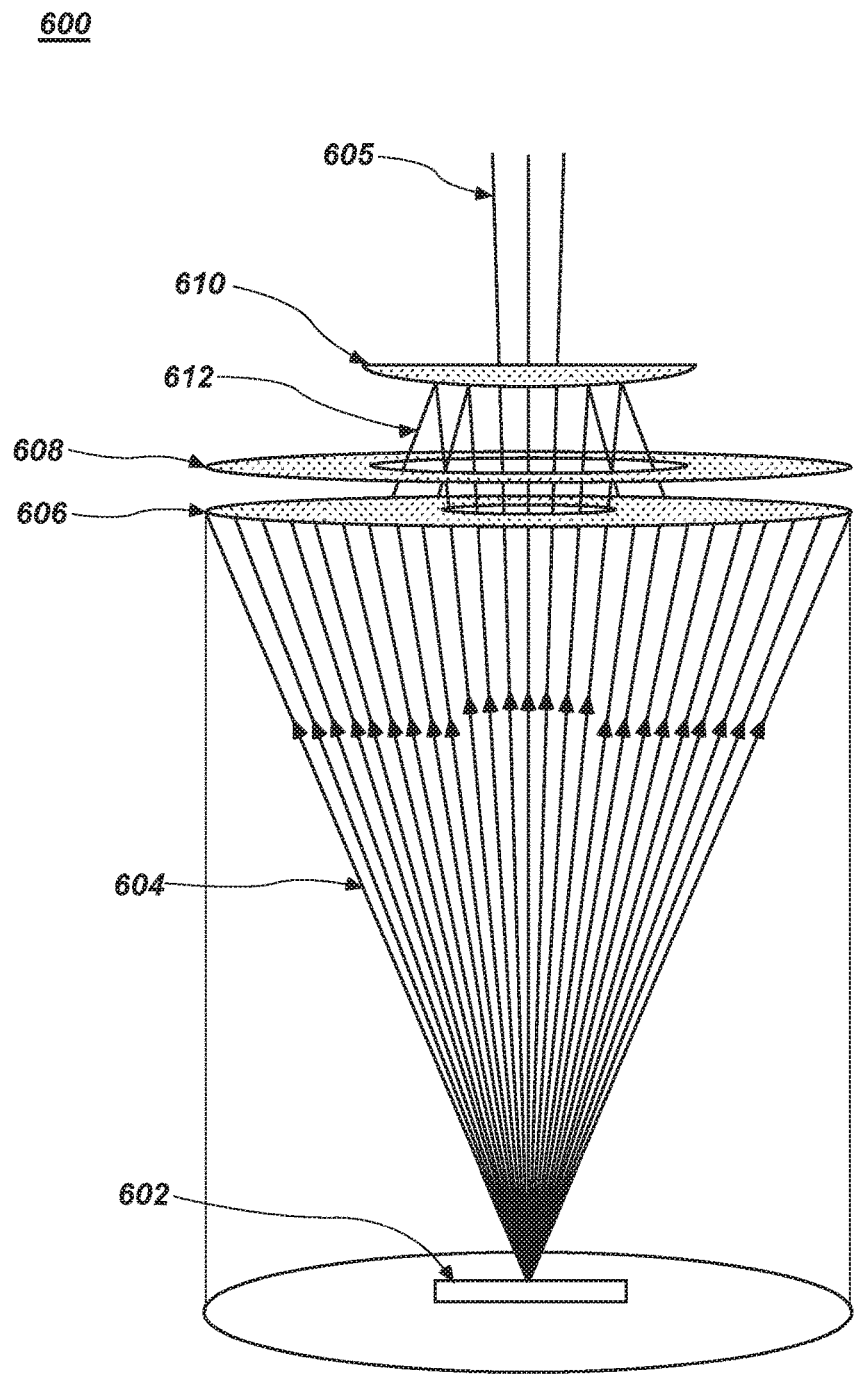
FIG. 6 illustrates a side cross-sectional view of a thermal imaging system in accordance with another example of the present disclosure.
Figure 7:
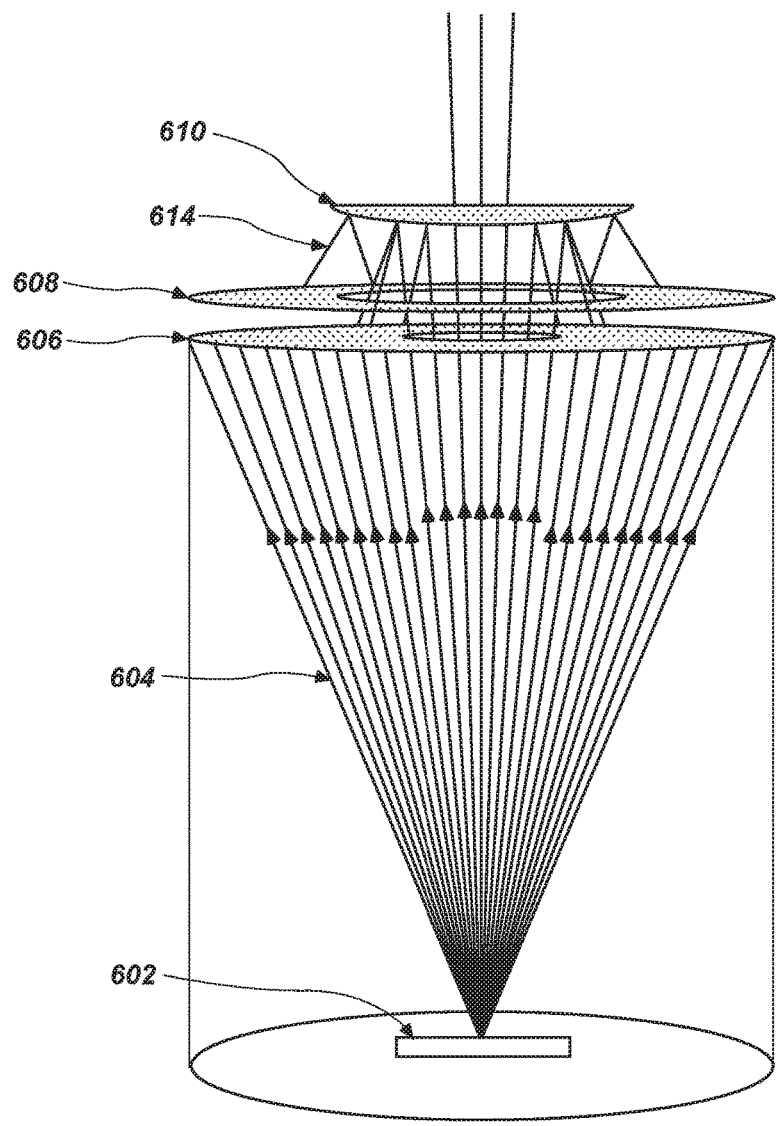
FIG. 7 illustrates a side cross-sectional view of the thermal imaging system of FIG. 6 showing a progression of the thermal energy reflecting between the window and the warm shield.
Figure 8:
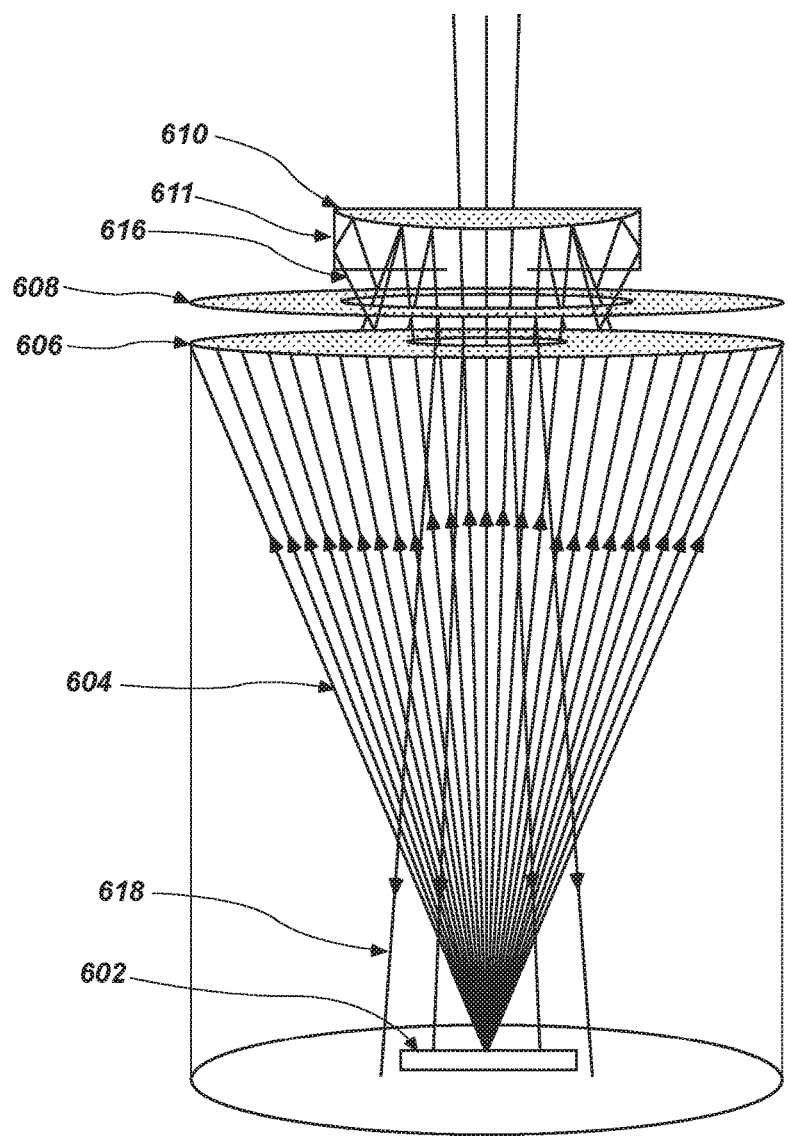
FIG. 8 illustrates a side cross-sectional view of the thermal imaging system of FIG. 6 showing a progression of the thermal energy reflecting between the window and the warm shield, the warm shield having a vertical surface or skirt that further reflects and redirects thermal energy.

Referring to FIGS. 6, 7, and 8, illustrated is a thermal imaging system 600 in accordance with an example of the present disclosure. The thermal imaging system 600 can comprise, at least in part, an FPA 602 housed in a Dewar enclosure 608. The thermal imaging system 600 can also comprise a warm shield 610 having a surface that is convex relative to the Dewar enclosure 608. The Dewar enclosure 608 can comprise a cold shield 606. The Dewar enclosure 608 or the components housed by the Dewar enclosure 608 can emit thermal energy 604. FIG. 6 depicts the thermal energy 604 as originating within the Dewar enclosure at the FPA 602. As depicted, a first portion of the thermal energy 604 travels along a path such that it impinges upon the surface of cold shield 606. A second portion of the thermal energy 604 travels along a path such that it passes through an opening or aperture of the cold shield 606, then through a window in the Dewar enclosure 608, and then further through an opening in the warm shield 610. The second portion of thermal energy 604 passing through these identified openings is depicted as thermal energy 605. A third portion of the thermal energy 604 travels along a path such that it passes through the opening in the cold shield 606, then through the window of the Dewar enclosure 608, but is then received on the warm shield 610 where it is reflected by the convex surface of the warm shield 610 in the direction shown. This third portion of thermal energy can be depicted as thermal energy 612. As depicted, as the thermal energy 612 is reflected off of the warm shield 610, it passes again through the window of the Dewar enclosure 608 where it subsequently impinges on a top surface of the cold shield 606. The curvature of the convex warm shield 610 can be tuned depending upon the particular application and configuration of the thermal imaging system. In one aspect, the curvature of the convex warm shield 610 can be tuned such that the thermal energy 612 is reflected at an angle sufficient to redirect the thermal energy away from the opening in the cold shield 606 rather than permitting it to pass back through the opening in the cold shield 606. This prevents thermal energy 612 from being detected by a detector supported and operable in the thermal imaging system 600, where such detection could cause the generation and presence of an artifact. By redirecting thermal energy 612 away from the opening in the cold shield 606, flooding of the thermal imaging system with its own radiation is avoided, and the chance for artifacts in images generated by the thermal imaging system 500 is greatly reduced.

FIG. 7 depicts the progression of the thermal energy reflecting between the window and the warm shield, and more specifically a portion of thermal energy 604 that passes through the opening in the cold shield 606, that then passes through the window of the Dewar enclosure 608, that is then reflected off the convex surface of the warm shield 610 and that then impinges on the warm top of the Dewar enclosure 608. This particular redirected portion of thermal energy is depicted as thermal energy 614. In one aspect, no rays of thermal energy reflecting off the convex surface of the warm shield 610 are permitted to escape back through the warm shield 610 opening even after experiencing a reflection. In other words, the convex curvature operates to reflect the thermal energy away at an angle sufficient to cause the thermal energy to be reflected back and forth between the warm surface of the Dewar enclosure 608 and the warm shield 610.

FIG. 8 depicts the thermal imaging system 600 in which the convex warm shield 610 further comprises a circumferential sidewall forming vertical surface or skirt 611. FIG. 8 depicts the further progression of the thermal energy reflecting between the window and the warm shield. The vertical skirt or surface 611 can comprise features similar to the vertical surface or skirt 410 of FIG. 4B, or of FIGS. 5A and 5B. In one aspect, the vertical surface 611 can function to redirect a portion of the thermal energy 612 (see FIG. 6), or the reflections that were found to terminate outside the aperture of the window on the warm top of the Dewar. The surface 611 can be referred to as a reflective skirt around the periphery of the warm shield 610. This 'skirt' serves to reflect and redirect these escaping rays back onto the top surface of the cold shield 606. The portion of the thermal energy that travels this path can be depicted as thermal energy 616. FIG. 8 further illustrates that as a result of the convex shape warm shield 620 and the presence of the vertical surface or 'skirt' 611, all thermal energy reflected between the warm shield 610 and the window of Dewar enclosure 608 terminates on the top surface of the cold shield 606.

Equation 9 shows that a convex warm shield will outperform a concave warm shield.

$$\phi_{total} = \phi_{scene} + \phi_{warmshield} \qquad \text{Equation 9}$$

This conclusion is, however, dependent, in part, upon geometric considerations. For example, it should be recognized in the thermal imaging system shown in FIGS. 6-8 that the size of the Dewar window should be configured to be large enough to admit all the reflections from the convex warm shield. In applying a warm shield with a convex surface to existing Dewar enclosures, this condition may not be met, although it can be depending upon the specific configuration of the Dewar enclosure. As a result, simply changing from a concave to a convex warm shield is not an assurance of success.

A combination of FPA area, (cold shield, warm shield) aperture shape and dimensions, FPA to (cold shield, window, warm shield) distance, warm shield curvature, window reflectance, emissivity and temperature of surfaces all play a role in determining if a convex warm shield will be effective. By effective, it is meant that, when a detector is staring at a low temperature blackbody, the background flux collected by the FPA due to self-emission of the assembly using a convex warm shield is comparable to or better than that of a concave warm shield.

It is noted that the Dewar and the warm shield do not comprise a closed system. There is the solid angle subtended by the warm shield aperture (stop) into which the optical system and the scene radiate. Radiation can also enter the system through the gap between the warm shield and the Dewar window. It is in this peripheral area that success or failure of the convex warm shield is found.

Figure 9:
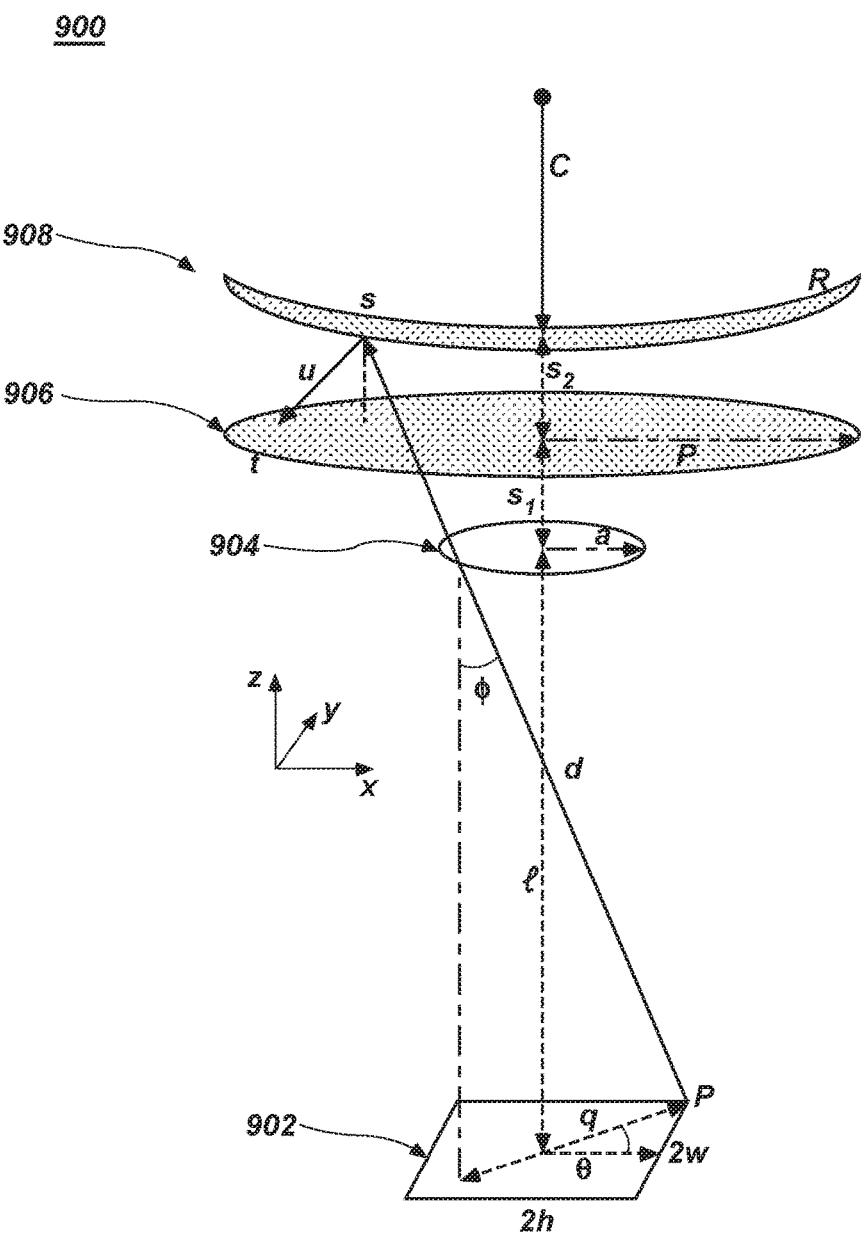
FIG. 9 illustrates a three dimensional view of an imaging system in accordance with an example of the present disclosure.

FIG. 9 depicts and describes mathematical relationships used to determine or tune effective curvatures of the convex surface, and determine the distance between a warm shield and a Dewar enclosure. FIG. 9 depicts thermal imaging system 900 with an FPA 902, a cold stop 904, a Dewar window 906, and a warm shield 908. The dimensions of the FPA 902 are depicted as 2w×2h where l is the distance between the FPA 902 and the cold stop 904. FIG. 9 depicts a as the radius of the cold stop 904, ρ as the radius of the Dewar window 906, $s_1$ as the distance between the cold stop 904 and the Dewar window 906, $s_2$ as the distance between the Dewar window 906 and the warm shield 908, c as the surface center of curvature of the warm shield 908. Equation 10 describes the warm shield 908 radius of curvature.

$$R=1/|c| \quad \text{Equation 10}$$

FIG. 9 further depicts n is the surface normal of the warm shield 908 surface at the point of intersection, x is the point of intersection on the spherical warm shield surface, d is the vector from the corner of the FPA 902 to the warm shield 908 surface. The vector d passes through the line normal to the FPA 902 at its center and touches the edge of the aperture of the cold stop 904 at the farthest point from its origin. The vector u begins at the tip of d and intersects with the plane containing the Dewar window 906. Its direction is determined by the direction of d and law of reflection at the warm shield surface. In order for a detector of the thermal imaging system 600 to be ensured of seeing only the top of the cold stop 904, the radial component of the vector sum d+u is to be less than the Dewar window 906 radius, or equation 11:

$$(d+u)_{radial} < \rho \quad \text{Equation 11}$$

These vectors can be determined as follows where the equation for a sphere with center c and radius R is described by equation 12:

$$\|x-c\|^2 = R^2 \quad \text{Equation 12}$$

where c is the center of the sphere defining the warm shield surface and x is the point of intersection with the ray. Any point x on a ray starting at point p with direction $\hat{d}$ can be written as equation 13:

$$x = p + t\hat{d} \quad \text{Equation 13}$$

with t being the distance between p and x. The substitution k=p−c leads to equation 14 and 15:

$$\|k+t\hat{d}\|^2 = R^2 \quad \text{Equation 14}$$

$$t^2 + 2(k \cdot \hat{d})t + k^2 - R^2 = 0 \quad \text{Equation 15}$$

so the distance between points p and s and therefore the length of vector d is described by equation 16 and 17:

$$t = -k \cdot \hat{d} \pm \sqrt{(k \cdot \hat{d})^2 + (k^2 - R^2)} \quad \text{Equation 16}$$

with $$\lfloor k \rfloor = (p_x - c_x)^2 + (p_y - c_y)^2 + (p_z - c_z)^2 \quad \text{Equation 17}$$

The unit vector $\hat{d}$ is described by equation 18:

$$\hat{d} = \sin\theta \sin\phi \hat{x} + \sin\theta \cos\phi \hat{y} + \cos\theta \hat{z} \quad \text{Equation 18}$$

and using the conventions of FIG. 9, equation 19 is represented as:

$$\tan\theta = \frac{w}{h}; \tan\phi = \frac{q}{l} \quad \text{Equation 19}$$

The vector u is in the direction of the reflection of d about the surface normal to the warm shield surface $\hat{n}$ at the point of intersection. Thus, its direction is described by equation 20:

$$\hat{u} = \hat{d} - 2(\hat{n} \cdot \hat{d})\hat{n} \quad \text{Equation 20}$$

The vector u is then described by equation 21:

$$u = s + \beta \hat{u} \quad \text{Equation 21}$$

Figure 10:
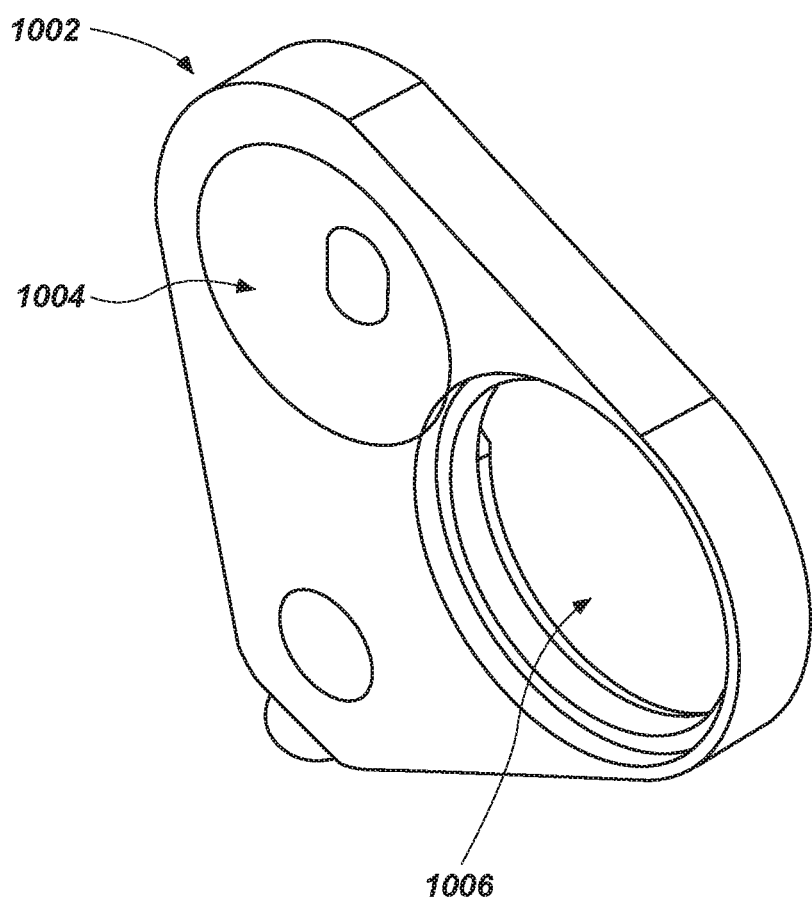
FIG. 10 illustrates a perspective view of a bracket operative with a warm shield within an imaging system, in accordance with an example of the present disclosure.

FIG. 10 depicts a bracket housing a convex warm shield. The bracket 1002 can be designed to house or hold the convex warm shield 1004. The convex warm shield 1004 can comprise features and can function similar to the convex warm shields discussed above. The bracket 1002 can be attached to a thermal imaging system in such a manner that the bracket 1002 can swivel or otherwise move the convex warm shield 1004 back and forth over or adjacent to the window or opening in the thermal imaging system. The bracket 1002 can further support a lens 1006, and thus, alternatively, the bracket 1002 can move the convex warm shield 1004 away from the opening in the convex warm shield 1004 and instead place the lens 1006 over the opening. This can be performed selectively based on input from a user of the thermal imaging system. Thus, the convex warm shield 1004 can be optionally employed during operations of the thermal imaging system. The lens 1006 can be glass, plastic, or other transparent material. The lens 1006 can be configured to focus light or thermal energy into or away from the opening of the thermal imaging system.

Figure 11:
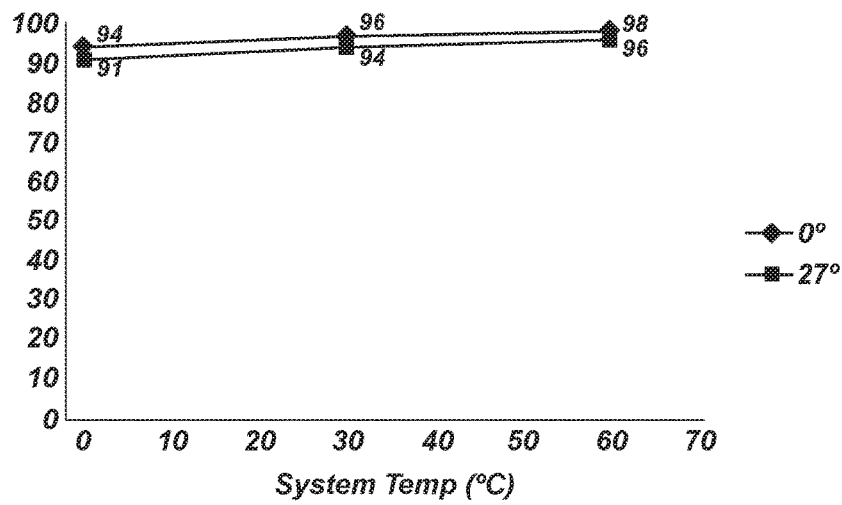
FIG. 11 illustrates two graphs showing performance of a warm shield in accordance with examples of the present disclosure.
Figure 11:
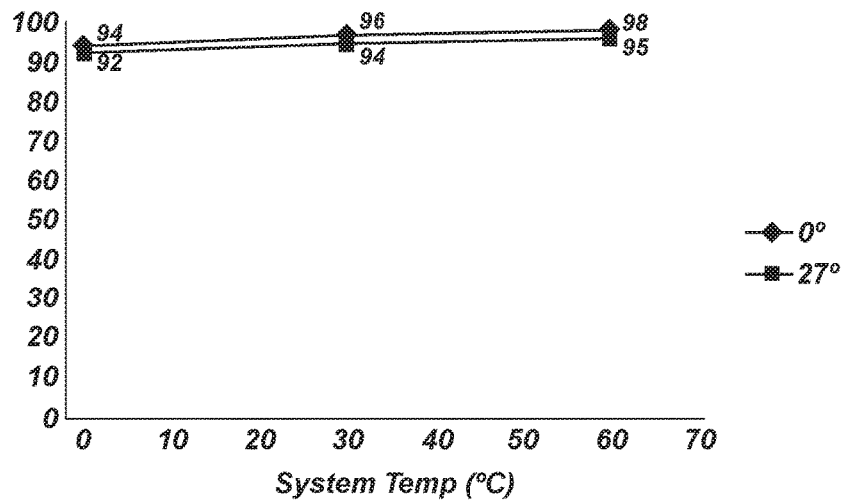

FIG. 11 depicts graphs showing performance of a warm shield in accordance with examples of the present invention. Graph 1102 shows results of a convex warm shield employed with a thermal imaging system at scene temperatures of 0 degrees and 27 degrees. This graph depicts a percentage of current warm shield mid wave background. Graph 1104 shows results of a convex warm shield employed with a thermal imaging system at scene temperatures of 0 degrees and 27 degrees. This graph depicts a percentage of current warm shield long wave background. The results of graphs 1102 and 1104 show self-emission background below that of conventional or concave warm shields for a similar range of operational scene and system temperatures.

In one example, the present disclosure can employ ray tracing for tracing the thermal energy or rays generated within the Dewar enclosure. The ray tracing can be valuable for designing the warm shield, including tuning the shape of the aperture in the warm shield and tuning the convex curvature of the warm shield, as well for determining how close in proximity the warm shield is to be relative to the opening in the Dewar enclosure. Ray tracing can help calculate what is termed the 'Geometrical Configuration Factor' ($GFC_{object}$). The ray tracing with the $GFC_{object}$ describes the behavior of a ray of thermal energy that is originated and reflected off of surfaces within the Dewar enclosure. This is proportional to the solid angle ($\Omega_{object}$) subtended by any object in the system as seen from the detector array. See equation 22:

$$GCF_{object} = \frac{\Omega_{object}}{\pi} \quad \text{Equation 22}$$

Using the Radiance theorem, the thermal signal at the detector due to each object in a system can be calculated with the following equation 23:

$$TSE_{W, photons} = \sum_{all\ objects} \varepsilon f\left\{\frac{\sigma_L T^4}{\sigma_p T^3}\right\} A_{detector} \frac{\Omega_{object}}{\pi} = \quad \text{Equation 23}$$

$$\sum_{all\ objects} \varepsilon f\left\{\frac{\sigma_L T^4}{\sigma_p T^3}\right\} A_{detector} GCF_{object}$$

Where $TSE_{W,\ photons}$=Thermal Self-Emission (in Watts or photons/sec).

Figure 12:
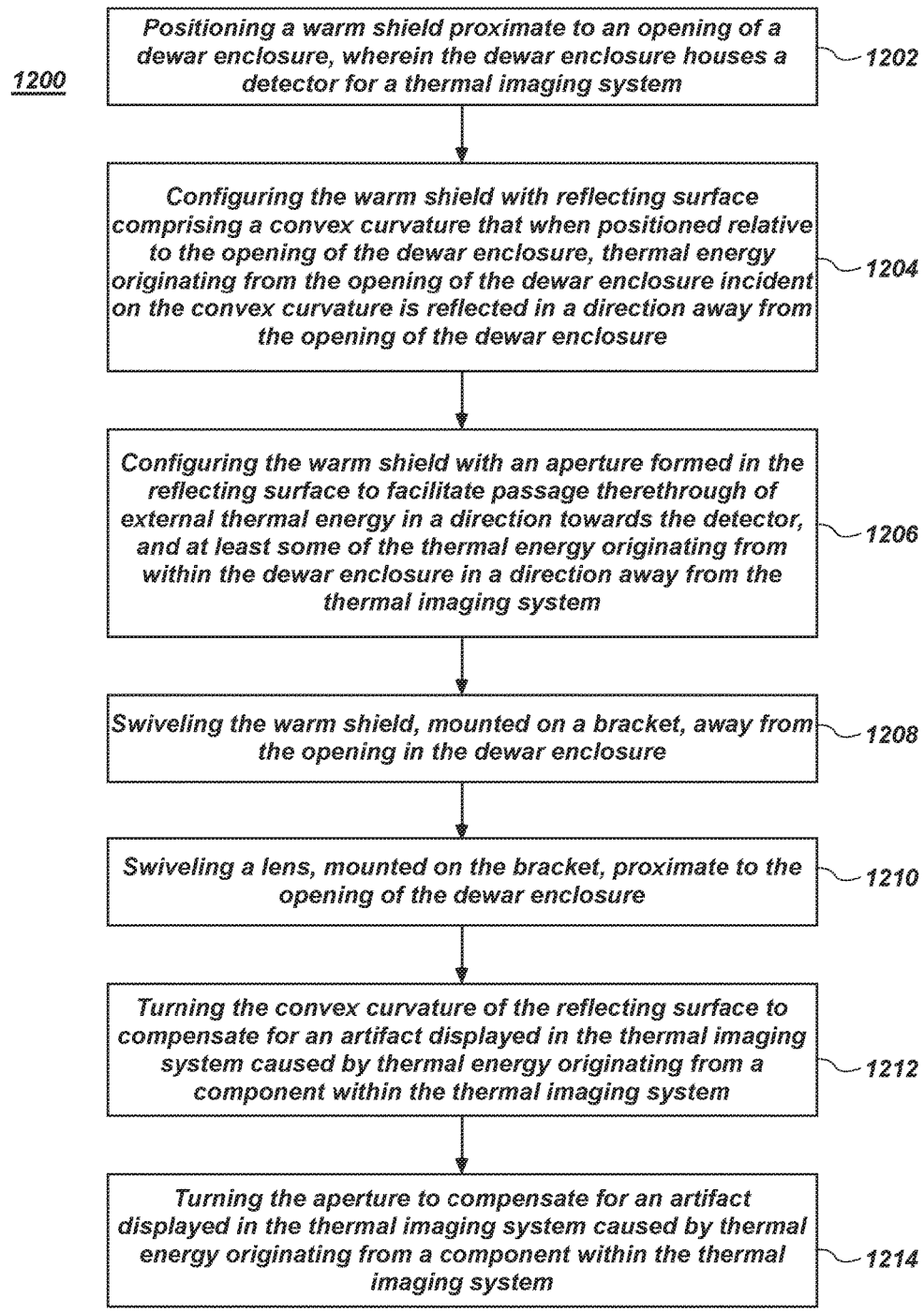
FIG. 12 illustrates a flowchart of an example method for facilitating thermal imaging in accordance with an example of the present disclosure.

FIG. 12 depicts a flowchart of a method 1200 for facilitating thermal imaging in accordance with an example of the present disclosure. At 1202, the method comprises positioning a warm shield proximate to an opening of a Dewar enclosure, wherein the Dewar enclosure houses a detector for a thermal imaging system. The method further comprises, at 1204, configuring the warm shield with a reflecting surface comprising a convex curvature that when positioned relative to the opening of the Dewar enclosure, causes thermal energy originating from the opening of the Dewar enclosure incident on the convex curvature to be reflected in a direction away from the opening of the Dewar enclosure. The method further comprises at 1206, configuring the warm shield with an aperture formed in the reflecting surface to facilitate passage therethrough of external thermal energy in a direction towards the detector, and passage of at least some of the thermal energy originating from within the Dewar enclosure in a direction away from the thermal imaging system. The method further comprises, at 1208, swiveling the warm shield, mounted on a bracket, away from the opening in the Dewar enclosure. The method still further comprises, at 1210, swiveling a lens, mounted on the bracket, to be proximate the opening of the Dewar enclosure. The method still further comprises, at 1212, tuning the convex curvature of the reflecting surface to compensate for an artifact displayed in the thermal imaging system caused by thermal energy originating from within the thermal imaging system. The method still further comprises, at 1214, tuning the aperture to compensate for an artifact displayed in the thermal imaging system caused by thermal energy originating from within the thermal imaging system.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present invention.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A warm shield as part of a thermal imaging system, comprising:
   a reflecting surface comprising a convex curvature when positioned relative to an opening of a thermal imaging system, wherein thermal energy originating from the opening of the thermal imaging system that is incident on the convex curvature is reflected in a direction away from the opening of the thermal imaging system; and
   an aperture formed in the reflecting surface positioned to facilitate passage therethrough of external thermal energy in a direction towards the opening of the thermal imaging system, at least some of the thermal energy originating from within the thermal imaging system in a direction away from the thermal imaging system, wherein the convex curvature of the reflecting surface is tuned to compensate for an artifact displayed in the thermal imaging system caused by thermal energy originating from a component within the thermal imaging system.

2. The warm shield of claim 1, wherein the aperture comprises a configuration tuned to compensate for an artifact displayed in the thermal imaging system caused by thermal energy originating from a component within the thermal imaging system.

3. The warm shield of claim 1, wherein the reflecting surface is configured to reflect the thermal energy that comprises mid wave and long wave bands in the electromagnetic spectrum.

4. A thermal imaging system, comprising:
   a Dewar enclosure having an opening;
   a detector supported within the Dewar enclosure, the detector configured to detect thermal radiation;
   a warm shield positioned proximate to the opening of the Dewar enclosure, the warm shield further comprising:
   a reflecting surface comprising a convex curvature that when positioned relative to the opening of the Dewar enclosure, thermal energy originating from the opening of the Dewar enclosure incident on the convex curvature is reflected in a direction away from the opening of the Dewar enclosure;

an aperture formed in the reflecting surface positioned to facilitate passage therethrough of external thermal energy in a direction towards the opening of the thermal imaging system, and at least some of the thermal energy originating from within the Dewar enclosure in a direction away from the thermal imaging system; and a bracket in support of the warm shield, the bracket further comprising a lens, wherein the bracket is selectively movable to position one of the warm shield and the lens to be aligned with the opening in the Dewar enclosure.

5. The thermal imaging system of claim 4, further comprising:

a window disposed between the warm shield and the Dewar enclosure.

6. The thermal imaging system of claim 4, further comprising a cold stop supported within the Dewar, the cold stop being disposed between the warm shield and the detector.

7. The thermal imaging system of claim 4, further comprising a cooling system operative with the Dewar enclosure to cool components housed within the Dewar enclosure.

8. The thermal imaging system of claim 4, wherein the convex curvature of the reflecting surface is tuned to compensate for an artifact displayed in the thermal imaging system caused by thermal energy originating from a component within the Dewar enclosure.

9. The thermal imaging system of claim 4, wherein the aperture comprises a configuration tuned to compensate for an artifact displayed in the thermal imaging system caused by thermal energy originating from a component within the Dewar enclosure.

10. The thermal imaging system of claim 4, wherein the reflecting surface is configured to reflect the thermal energy that comprises mid wave and long wave bands in the electromagnetic spectrum.

11. A method for facilitating thermal imaging, comprising:

providing a warm shield operative to be located proximate to an opening of a Dewar enclosure housing a detector;

configuring the warm shield to comprise a reflecting surface comprising a convex curvature, such that when positioned relative to the opening of the Dewar enclosure, thermal energy originating from within the Dewar enclosure incident on the convex curvature is reflected in a direction away from the opening of the Dewar enclosure;

configuring the warm shield to comprise an aperture formed in the reflecting surface to facilitate passage therethrough of external thermal energy in a direction towards the detector, and passage of at least some of the thermal energy originating from within the Dewar enclosure in a direction away from the thermal imaging system; and providing a bracket operative with the Dewar enclosure, the bracket being configured to support the warm shield, and to selectively move to position the warm shield about the opening in the Dewar enclosure.

12. The method of claim 11, further comprising configuring the bracket to support a lens, the bracket being selectively movable to position the lens about the opening in the Dewar enclosure.

13. The method of claim 11, further comprising facilitating the mounting of the warm shield and the thermal imaging system in an aircraft.

14. The method of claim 11, further comprising tuning the convex curvature of the reflecting surface to compensate for an artifact displayed in the thermal imaging system caused by thermal energy originating from a component within the thermal imaging system.

15. The method of claim 11, further comprising tuning the aperture to compensate for an artifact displayed in the thermal imaging system caused by thermal energy originating from a component within the thermal imaging system.

16. A warm shield as part of a thermal imaging system, comprising:

a reflecting surface comprising a convex curvature when positioned relative to an opening of a thermal imaging system, wherein thermal energy originating from the opening of the thermal imaging system that is incident on the convex curvature is reflected in a direction away from the opening of the thermal imaging system; and an aperture formed in the reflecting surface positioned to facilitate passage therethrough of external thermal energy in a direction towards the opening of the thermal imaging system, at least some of the thermal energy originating from within the thermal imaging system in a direction away from the thermal imaging system, wherein the aperture comprises a configuration tuned to compensate for an artifact displayed in the thermal imaging system caused by thermal energy originating from a component within the thermal imaging system.

17. A thermal imaging system, comprising:

a Dewar enclosure having an opening;

a detector supported within the Dewar enclosure, the detector configured to detect thermal radiation;

a warm shield positioned proximate to the opening of the Dewar enclosure, the warm shield further comprising:

a reflecting surface comprising a convex curvature that when positioned relative to the opening of the Dewar enclosure, thermal energy originating from the opening of the Dewar enclosure incident on the convex curvature is reflected in a direction away from the opening of the Dewar enclosure; and an aperture formed in the reflecting surface positioned to facilitate passage therethrough of external thermal energy in a direction towards the opening of the thermal imaging system, and at least some of the thermal energy originating from within the Dewar enclosure in a direction away from the thermal imaging system, wherein the convex curvature of the reflecting surface is tuned to compensate for an artifact displayed in the thermal imaging system caused by thermal energy originating from a component within the Dewar enclosure.

18. A thermal imaging system, comprising:

a Dewar enclosure having an opening;

a detector supported within the Dewar enclosure, the detector configured to detect thermal radiation;

a warm shield positioned proximate to the opening of the Dewar enclosure, the warm shield further comprising:

a reflecting surface comprising a convex curvature that when positioned relative to the opening of the Dewar enclosure, thermal energy originating from the opening of the Dewar enclosure incident on the convex curvature is reflected in a direction away from the opening of the Dewar enclosure; and an aperture formed in the reflecting surface positioned to facilitate passage therethrough of external thermal energy in a direction towards the opening of the thermal imaging system, and at least some of the thermal energy originating from within the Dewar enclosure in a direction away from the thermal imaging system, wherein the aperture comprises a configuration tuned to compensate for an artifact displayed in the thermal imaging system caused by thermal energy originating from a component within the Dewar enclosure.

19. A method for facilitating thermal imaging, comprising:
providing a warm shield operative to be located proximate to an opening of a Dewar enclosure housing a detector;
configuring the warm shield to comprise a reflecting surface comprising a convex curvature, such that when positioned relative to the opening of the Dewar enclosure, thermal energy originating from within the Dewar enclosure incident on the convex curvature is reflected in a direction away from the opening of the Dewar enclosure;
configuring the warm shield to comprise an aperture formed in the reflecting surface to facilitate passage therethrough of external thermal energy in a direction towards the detector, and passage of at least some of the thermal energy originating from within the Dewar enclosure in a direction away from the thermal imaging system; and
configuring the bracket to support a lens, the bracket being selectively movable to position the lens about the opening in the Dewar enclosure.

20. A method for facilitating thermal imaging, comprising:
providing a warm shield operative to be located proximate to an opening of a Dewar enclosure housing a detector;
configuring the warm shield to comprise a reflecting surface comprising a convex curvature, such that when positioned relative to the opening of the Dewar enclosure, thermal energy originating from within the Dewar enclosure incident on the convex curvature is reflected in a direction away from the opening of the Dewar enclosure;
configuring the warm shield to comprise an aperture formed in the reflecting surface to facilitate passage therethrough of external thermal energy in a direction towards the detector, and passage of at least some of the thermal energy originating from within the Dewar enclosure in a direction away from the thermal imaging system; and
tuning the convex curvature of the reflecting surface to compensate for an artifact displayed in the thermal imaging system caused by thermal energy originating from a component within the thermal imaging system.

21. A method for facilitating thermal imaging, comprising:
providing a warm shield operative to be located proximate to an opening of a Dewar enclosure housing a detector;
configuring the warm shield to comprise a reflecting surface comprising a convex curvature, such that when positioned relative to the opening of the Dewar enclosure, thermal energy originating from within the Dewar enclosure incident on the convex curvature is reflected in a direction away from the opening of the Dewar enclosure;
configuring the warm shield to comprise an aperture formed in the reflecting surface to facilitate passage therethrough of external thermal energy in a direction towards the detector, and passage of at least some of the thermal energy originating from within the Dewar enclosure in a direction away from the thermal imaging system; and
tuning the aperture to compensate for an artifact displayed in the thermal imaging system caused by thermal energy originating from a component within the thermal imaging system.

* * * * *